(12) United States Patent
Fan et al.

(10) Patent No.: US 10,390,280 B2
(45) Date of Patent: Aug. 20, 2019

(54) METHOD FOR INITIATING HANDOVER, WIRELESS DEVICE AND BASE STATION

(71) Applicant: Telefonaktiebolaget L M Ericsson (publ), Stockholm (SE)

(72) Inventors: Rui Fan, Beijing (CN); Jinhua Liu, Beijing (CN); Yu Qian, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 503 days.

(21) Appl. No.: 14/778,812

(22) PCT Filed: Mar. 25, 2013

(86) PCT No.: PCT/CN2013/073113
§ 371 (c)(1),
(2) Date: Sep. 21, 2015

(87) PCT Pub. No.: WO2014/153700
PCT Pub. Date: Oct. 2, 2014

(65) Prior Publication Data
US 2016/0050608 A1   Feb. 18, 2016

(51) Int. Cl.
*H04J 3/00* (2006.01)
*H04W 36/30* (2009.01)
(Continued)

(52) U.S. Cl.
CPC .............. *H04W 36/30* (2013.01); *H04L 5/14* (2013.01); *H04L 5/1469* (2013.01);
(Continued)

(58) Field of Classification Search
CPC ....... H04L 5/14; H04L 5/1469; H04L 5/0055; H04W 72/0446; H04W 72/042
See application file for complete search history.

(56) References Cited

U.S. PATENT DOCUMENTS 9,432,136 B2    8/2016  Kim et al.
2007/0086417 A1*  4/2007  Jang ...................... H04L 1/0025
                                                                370/347
(Continued)

FOREIGN PATENT DOCUMENTS

CN    102204154 A    9/2011
CN    102238568 A    11/2011
(Continued)

OTHER PUBLICATIONS

Communication with Supplementary European Search Report, European Application No. 13880657.5, dated Nov. 15, 2016.
(Continued)

*Primary Examiner* — Atique Ahmed
(74) *Attorney, Agent, or Firm* — Sage Patent Group (57) ABSTRACT

The present disclosure provides a method in a wireless device for initiating a handover from a source base station to a target base station. The method includes calculating a power offset indicative of a difference between a receiving power from the target base station and a receiving power from the source base station. A Time Division Duplex (TDD) configuration difference is obtained between a TDD configuration of the target base station and a TDD configuration of the source base station. A TDD offset is calculated based on the TDD configuration difference and an uplink-downlink traffic model of the wireless device. The handover is initiated based on a combination of the power offset and the TDD offset exceeding a threshold. The present disclosure also provides a wireless device, a method in a base station and a base station.

18 Claims, 5 Drawing Sheets

(51) Int. Cl.
*H04W 36/00* (2009.01)
*H04L 5/14* (2006.01)
*H04W 36/08* (2009.01)
*H04W 92/20* (2009.01)

(52) U.S. Cl.
CPC . *H04W 36/0083* (2013.01); *H04W 36/00837* (2018.08); *H04W 36/08* (2013.01); *H04W 92/20* (2013.01)

(56) References Cited

U.S. PATENT DOCUMENTS

| | | | | |
|---|---|---|---|---|
| 2009/0249153 | A1* | 10/2009 | Zhang | H04L 1/1887 714/748 |
| 2010/0322118 | A1* | 12/2010 | Fang | H04W 36/08 370/280 |
| 2011/0019634 | A1* | 1/2011 | Fujii | H04W 16/14 370/329 |
| 2012/0069756 | A1 | 3/2012 | Ji et al. | |
| 2012/0113875 | A1 | 5/2012 | Alanärä et al. | |
| 2012/0177006 | A1* | 7/2012 | Tsai | H04W 36/08 370/331 |
| 2013/0028161 | A1* | 1/2013 | Maeda | H04L 5/0048 370/311 |
| 2013/0044652 | A1 | 2/2013 | Wang et al. | |
| 2013/0182649 | A1* | 7/2013 | Kwon | H04L 5/001 370/328 |
| 2013/0196664 | A1* | 8/2013 | Yiu | H04W 4/70 455/436 |
| 2013/0301423 | A1* | 11/2013 | Sirotkin | H04W 4/90 370/241.1 |
| 2013/0343241 | A1* | 12/2013 | Niu | H04B 15/00 370/280 |
| 2014/0086112 | A1* | 3/2014 | Stern-Berkowitz | H04W 72/1289 370/280 |
| 2014/0161002 | A1* | 6/2014 | Gauvreau | H04L 1/1893 370/280 |
| 2014/0198680 | A1* | 7/2014 | Siomina | H04L 5/14 370/252 |
| 2014/0233439 | A1* | 8/2014 | Hong | H04W 72/1221 370/280 |
| 2014/0301256 | A1* | 10/2014 | Yao | H04L 5/0091 370/280 |

FOREIGN PATENT DOCUMENTS

| | | |
|---|---|---|
| CN | 102724719 A | 10/2012 |
| WO | WO 2010/049587 A1 | 5/2010 |
| WO | WO 2011/162656 A1 | 12/2011 |
| WO | WO 2012/084001 A1 | 6/2012 |
| WO | WO 2012/112184 A1 | 8/2012 |
| WO | WO 2012/118345 A2 | 9/2012 |
| WO | WO 2012/163151 A1 | 12/2012 |

OTHER PUBLICATIONS

International Search Report, Application No. PCT/CN2013/073113, dated Jan. 2, 2014.
Written Opinion of the International Searching Authority, Application No. PCT/CN2013/073113, dated Jan. 2, 2014.
3GPP, Technical Specification, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0 (Mar. 2013), 344 pp.
Extended European Search Report, European Patent Application No. 18176864.9, dated Oct. 5, 2018, 9 pages.

* cited by examiner

METHOD FOR INITIATING HANDOVER, WIRELESS DEVICE AND BASE STATION

CROSS REFERENCE TO RELATED APPLICATION

This application is a 35 U.S.C. § 371 national stage application of PCT International Application No. PCT/CN2013/073113, filed on Mar. 25, 2013, the disclosure and content of which is incorporated by reference herein in its entirety. The above-referenced PCT International Application was published in the English language as International Publication No. WO 2014/153700 A1 on Oct. 2, 2014.

TECHNICAL FIELD

The disclosure relates to communication technology, and more particularly, to a method for initiating handover, a wireless device and a base station.

BACKGROUND

Currently in the $3^{rd}$ Generation Partner Project (3GPP), a feature of dynamic Time Division Duplex (TDD) reconfiguration has been introduced in the Long Term Evolution (LTE) system. That is, the TDD configuration in a cell is not fixed but may vary depending on actual traffic requirements. For example, if more traffic is required in the Downlink (DL), more subframes can be allocated to the DL. On the other hand, if more traffic is required in the Uplink (UL), more subframes can be allocated to the UL.

A wireless device (also referred to as user device or user equipment) may initiate a handover from a source cell to a target cell while moving in a wireless communication system. Conventionally, a decision to initiate a handover is made based on one or more radio quality metrics indicative of a difference between a receiving power from the target base station and a receiving power from the source base station. Examples of the radio quality metrics are Reference Signal Receiving Power (RSRP) and/or Reference Signal Receiving Quality (RSRQ). Such handover scheme is well suitable for a scenario where a single TDD configuration is deployed in both the source cell and the target cell. However, with the dynamic TDD reconfiguration, the TDD configuration of the source cell may be different from that of the target cell. As an example, a wireless device which is downloading web pages prefers to be served by a cell providing more DL subframes, i.e., having more DL time-frequency resources available, whereas a wireless device which is uploading pictures prefers to be served by a cell providing more UL subframes, i.e., having more UL time-frequency resources available. In this case, if the target cell provides more DL subframes and thus less UL subframes than the source cell, a wireless device having more UL traffic would experience UL transmission performance degradation in the target cell after the handover. On the other hand, if the target cell provides more UL subframes and thus less DL subframes than the source cell, a wireless device having more DL traffic will experience DL transmission performance degradation in the target cell after the handover.

SUMMARY

Therefore, there is a need for a handover solution in which the TDD configuration difference between the target cell and the source cell as well as the uplink-downlink traffic model of the wireless device are considered in addition to the radio quality metrics when a decision to initiate a handover is made, so as to achieve an improved user experience.

It is an object of the present disclosure to overcome at least some of the problems in the prior art.

According to a first aspect of the present disclosure, a method in a wireless device for initiating a handover from a source base station to a target base station is provided. The method includes the steps of: calculating a power offset indicative of a difference between a receiving power from the target base station and a receiving power from the source base station; obtaining a Time Division Duplex (TDD) configuration difference between a TDD configuration of the target base station and a TDD configuration of the source base station; calculating a TDD offset based on the TDD configuration difference and an uplink-downlink traffic model of the wireless device; and initiating the handover when a combination of the power offset and the TDD offset exceeds a threshold.

According to a second aspect of the present disclosure, a wireless device is provided. The wireless device includes: a transceiver adapted to communicate with a source base station and a target base station; a processor; and a memory storing instructions. The instructions, when executed by the processor, cause the wireless device to: calculate a power offset indicative of a difference between a receiving power from the target base station and a receiving power from the source base station; obtain a Time Division Duplex (TDD) configuration difference between a TDD configuration of the target base station and a TDD configuration of the source base station; calculate a TDD offset based on the TDD configuration difference and an uplink-downlink traffic model of the wireless device; and initiate a handover from the source base station to the target base station when a combination of the power offset and the TDD offset exceeds a threshold.

According to a third aspect of the present disclosure, a method in a first base station is provided. The method includes the steps of: obtaining a Time Division Duplex (TDD) configuration of a second base station; calculating a TDD configuration difference between the TDD configuration of the second base station and a TDD configuration of the first base station; and transmitting the TDD configuration difference to a wireless device to enable the wireless device to initiate a handover from the first base station to the second base station at least partly based on the TDD configuration difference.

According to a fourth aspect of the present disclosure, a base station is provided. The base station includes: a transceiver adapted to communicate with another base station and a wireless device; a processor; and a memory storing instructions. The instructions, when executed by the processor, cause the base station to: obtain a Time Division Duplex (TDD) configuration of another base station; calculate a TDD configuration difference between the TDD configuration of the other base station and a TDD configuration of the base station; and transmit the TDD configuration difference to a wireless device to enable the wireless device to initiate a handover from the base station to the other base station at least partly based on the TDD configuration difference.

With the embodiments of the present disclosure, in addition to the radio quality metrics, the TDD configuration difference between the target cell and the source cell as well as the uplink-downlink traffic model of the wireless device are considered in addition to the radio quality metrics when a decision to initiate a handover is made. In this way, the user experience can be improved.

BRIEF DESCRIPTION OF THE DRAWINGS

The above and other objects, features and advantages will be more apparent from the following description of embodiments with reference to the figures, in which.

DETAILED DESCRIPTION

The embodiments of the present disclosure will be detailed below with reference to the drawings. It should be noted that the following embodiments are illustrative only, rather than limiting the scope of the present disclosure. It should be also noted that, while the following embodiments are described with respect to the LTE system, the present disclosure is not limited thereto. Rather, the present disclosure is applicable to any wireless communication system where different TDD configurations are deployed in adjacent cells.

Figure 1:
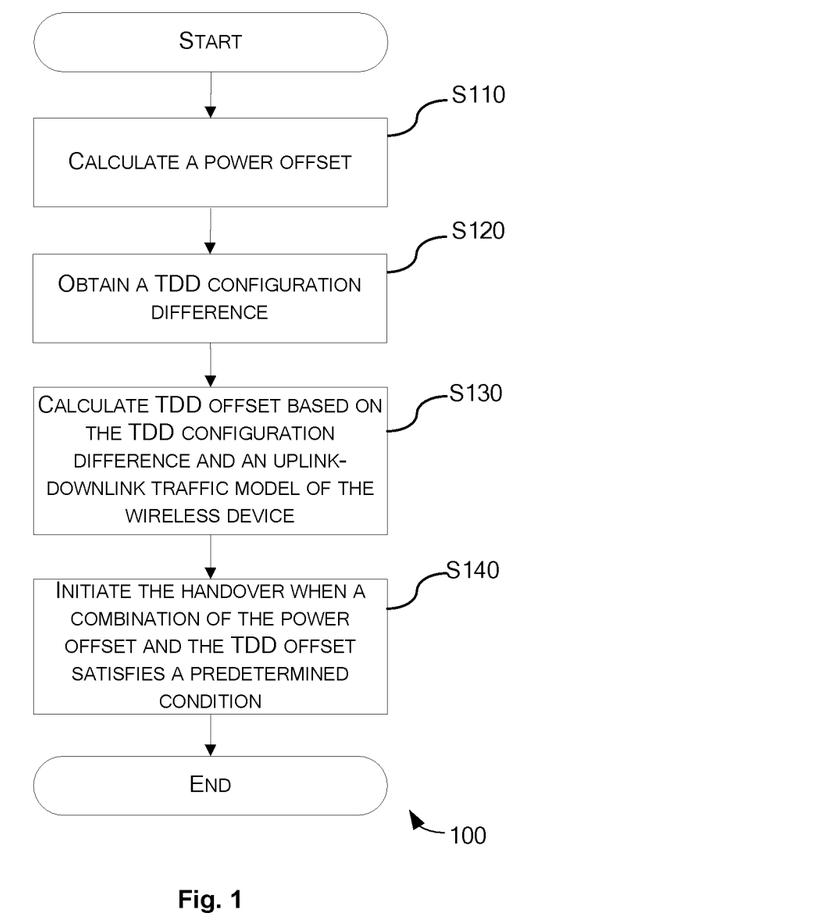
FIG. 1 is a flowchart illustrating a method in a wireless device for initiating a handover according to an embodiment of the present disclosure.

FIG. 1 is a flowchart illustrating a method 100 in a wireless device for initiating a handover from a source base station to a target base station according to an embodiment of the present disclosure.

At step S110, the wireless device calculates a power offset indicative of a difference between a receiving power from the target base station and a receiving power from the source base station. Here, the receiving powers can be represented by e.g., RSRP or RSRQ as noted above, and can be measured using any appropriate process as known in the art.

The power offset can be represented in dB. For example, a power offset of 10 dB means that the receiving power from the target base station is 10 dB higher than the receiving power from the source base station, whereas a power offset of −10 dB means that the receiving power from the target base station is 10 dB lower than the receiving power from the source base station.

At step S120, the wireless device obtains a Time Division Duplex (TDD) configuration difference between a TDD configuration of the target base station and a TDD configuration of the source base station. According to embodiments of the present disclosure, the TDD configuration of the target base station may be a current TDD configuration of the target base station or a potential TDD configuration of the target base station. The potential TDD configuration is a configuration to which the target base station possibly switches in a future time period, e.g., in accordance with the traffic condition in the target cell.

In an embodiment, the TDD configuration difference comprises an uplink configuration difference and a downlink configuration difference. The uplink configuration difference indicates a difference between the number of uplink subframes in a radio frame in the TDD configuration of the target base station and the number of uplink subframes in a radio frame in the TDD configuration of the source base station. The downlink configuration difference indicates a difference between the number of downlink subframes in a radio frame in the TDD configuration of the target base station and the number of downlink subframes in a radio frame in the TDD configuration of the source base station.

As a non-limiting example, in the TDD configuration of the target base station, the number of uplink subframes in a radio frame, denoted as $NUL_T$, is 2 and the number of downlink subframes in a radio frame, denoted as $NDL_T$, is 8. In the TDD configuration of the source base station, the number of uplink subframes in a radio frame, denoted as $NUL_S$, is 4 and the number of downlink subframes in a radio frame, denoted as $NDL_S$, is 6. In this example, the uplink configuration difference, $d_U$, can be calculated, logarithmically, as $$d_U = \text{lin2db}(NUL_T/NUL_S) = \text{lin2db}(2/4) = -3 \text{ dB},$$

where lin2db( ) is a well known function for converting a linear value into a logarithmical value.

Similarly, the downlink configuration difference, $d_L$, can be calculated as $$d_L = \text{lin2db}(NDL_T/NDL_S) = \text{lin2db}(8/6) = 1.24 \text{ dB}.$$

Here, the TDD configuration difference can be calculated by the source base station and the wireless device can receive the TDD configuration difference from the source base station. Alternatively, the wireless device can receive the TDD configuration of the target base station and the TDD configuration of the source base station and calculate the TDD configuration difference by itself.

At step S130, the wireless device calculates a TDD offset based on the TDD configuration difference and an uplink-downlink traffic model of the wireless device.

According to embodiments of the present disclosure, if the uplink-downlink traffic model of the wireless device indicates that more uplink than downlink traffic is desired by the wireless device, then the TDD offset is calculated as a positive value if the TDD configuration difference indicates that the target base station is able to provide more uplink resources than the source base station and the TDD offset is calculated as a negative value if the TDD configuration difference indicates that the target base station is able to provide less uplink resources than the source base station.

On the other hand, if the uplink-downlink traffic model of the wireless device indicates that more downlink than uplink traffic is desired by the wireless device, then the TDD offset is calculated as a positive value if the TDD configuration difference indicates that the target base station is able to provide more downlink resources than the source base station and the TDD offset is calculated as a negative value if the TDD configuration difference indicates that the target base station is able to provide less downlink resources than the source base station.

In an embodiment, the uplink-downlink traffic model of the wireless device can be represented by a ratio of uplink traffic desired by the wireless device to downlink traffic desired by the wireless device and the TDD offset can be calculated by weighting the uplink configuration difference and the downlink configuration difference by the ratio.

In the above non-limiting example where the uplink configuration difference is −3 dB and the downlink configuration difference is 1.24 dB, assuming the ratio of uplink traffic desired by the wireless device to downlink traffic desired by the wireless device, denoted as u:d, to be 1:9, the TDD offset can be calculated as:

$$(u/(u+d))*d_U+(d/(u+d))*d_L=(1/(1+9))*(-3)+(9/(1+9))\\*(1.24)=0.816 \text{ dB}.$$

At step S140, the wireless device initiates the handover when a combination of the power offset and the TDD offset exceeds a threshold. For example, the wireless device can initiate the handover by transmitting an A3 measurement report to the source base station. According to 3GPP Technical Specification (TS) 36.331, v 11.3.0, section 5.5.4.4, an A3 measurement report contains receiving powers from the base stations as measured by the wireless device. Here, the TDD offset can be added to the measured receiving power from the target base station in the A3 measurement report. For example, if the receiving power from the target base station as measured by the wireless device is x dBm and the TDD offset is y dB, the receiving power from the target base station in the A3 measurement report can be (x+y) dBm. Upon receiving the A3 measurement report, the source base station can transmit a handover request to the target base station. The subsequent handover procedure is known in the art and the description thereof will be omitted here.

In the above example where the TDD offset is 0.816 dB, it is further assumed that the threshold is 6 dB, for example. According to the conventional handover scheme where only the power offset is considered when making the decision to initiate a handover, a power offset equal to or higher than 6 dB is required to trigger the handover. However, according to embodiments of the present disclosure, since the wireless device desires more downlink traffic and the target base station is currently or potentially able to provide more downlink resources than the source base station, the power offset and the TDD offset are combined such that a power offset equal to or higher than 6−0.816=5.184 dB will trigger the handover. That is, the determination as to whether to initiate a handover or not is now made based on the sum of the power offset and the TDD offset. More specifically, the wireless device initiates the handover when the sum of the power offset and the TDD offset exceeds the threshold. In this way, the preference of the wireless device with respect to uplink or downlink resources is considered in the handover process.

Next, some examples will be given to explain signaling sequences for implementing the above method 100. FIGS. 2-5 are sequence diagrams showing signaling exchange examples among a wireless device, a source base station and a target base station according to embodiments of the present disclosure.

Figure 2:
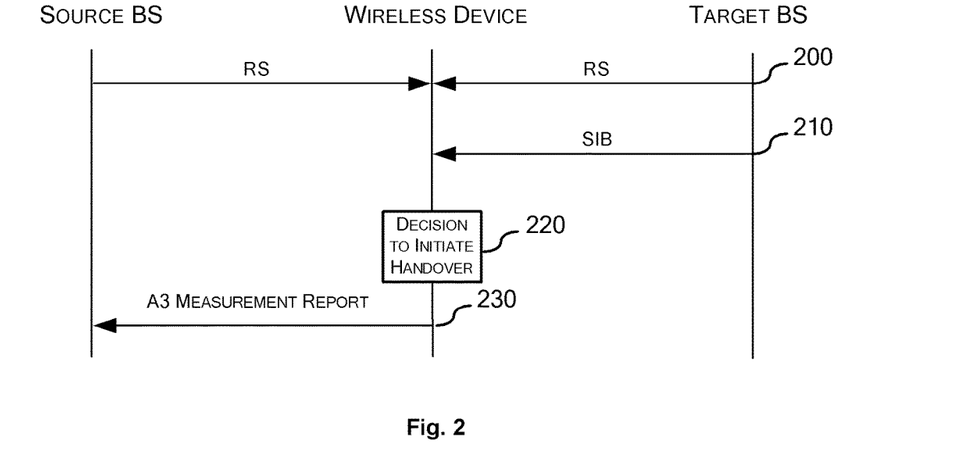
FIGS. 2-5 are sequence diagrams showing signaling exchange examples among a wireless device, a source base station and a target base station according to embodiments of the present disclosure.

Referring to FIG. 2, the wireless device receives 200 a Reference Signal (RS) from each of the target base station and the source base station, measures the RSRP or RSRQ for each base station, and then calculates the power offset based on the measured RSRPs or RSRQs.

Then, the wireless device receives 210 a System Information Broadcast (SIB) from the target base station and extracts from the SIB information on the current TDD configuration of the target base station. Since the wireless device is currently served by the source base station, the current TDD configuration of the source base station is naturally known to the wireless device. Then at 220, the decision to initiate a handover is made. In particular, the wireless device calculates the TDD configuration difference, calculates the TDD offset and decides to initiate a handover based on the combination of the power offset and the TDD offset. The wireless device then transmits 230 an A3 measurement report to initiate the handover. As noted above, the TDD offset is reflected in the A3 measurement report and thus the base station can finally make a handover decision based on the A3 measurement report.

Figure 3:
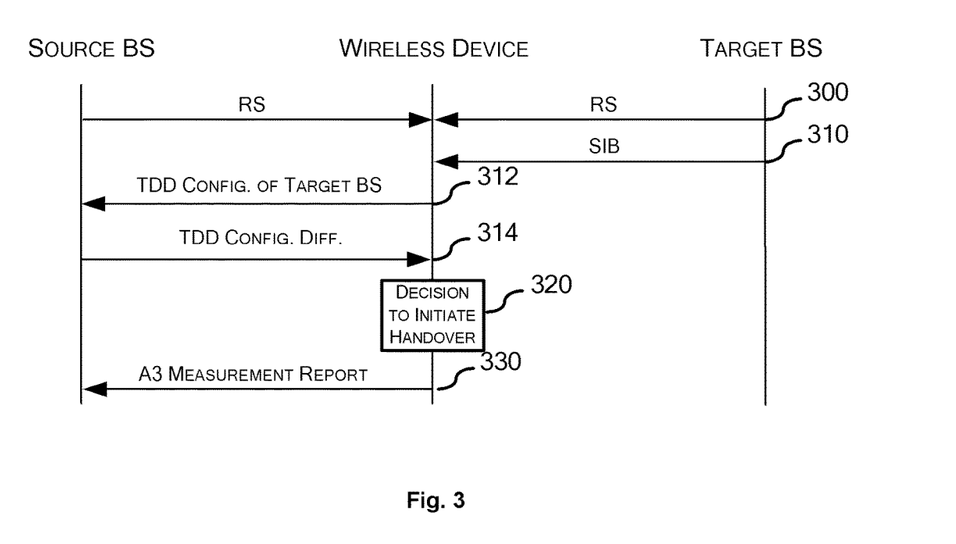

FIG. 3 shows an alternative to the sequence shown in FIG. 2. The sequence in FIG. 3 is basically the same as that in FIG. 2, except that the wireless device receives the TDD configuration difference from the source base station instead of calculating it by itself. In particular, the wireless device transmits 312 the TDD configuration of the target base station to the source base station such that the source base station can calculate the TDD configuration difference. Alternatively, the source base station can receive the TDD configuration of the target base station from the target base station via an X2 interface or receive a system information broadcast (SIB) from the target base station indicating the TDD configuration of the target base station. Then, the wireless device receives 314 the TDD configuration difference from the source base station. At 320, the wireless device calculates the TDD offset and decides to initiate a handover based on the combination of the power offset and the TDD offset. The steps 300, 310 and 330 in FIG. 3 are substantially the same as the steps 200, 210 and 230 in FIG. 2 and thus the description thereof will be omitted here.

Figure 4:
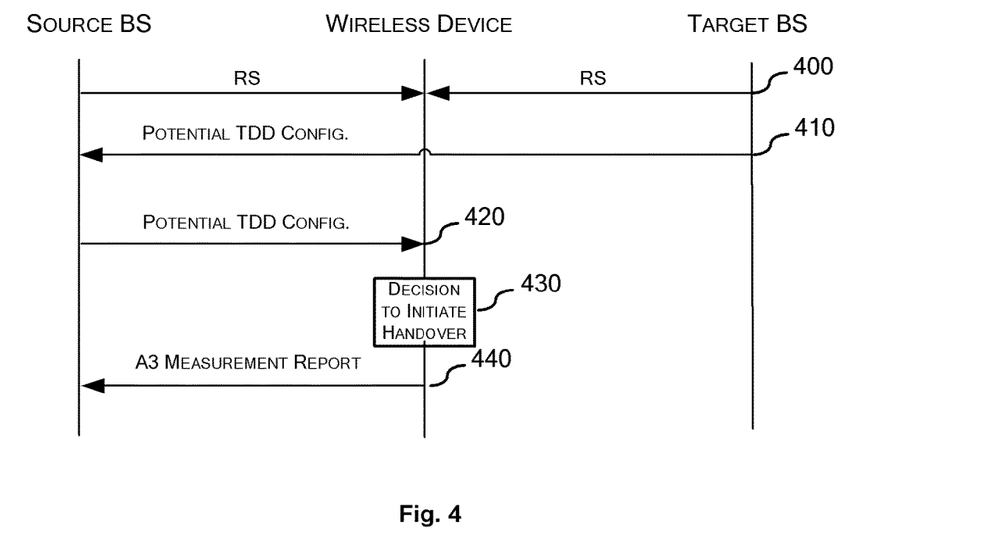

As another example, referring to FIG. 4, the wireless device receives 400 a Reference Signal (RS) from each of the target base station and the source base station, measures the RSRP or RSRQ for each base station, and then calculates the power offset based on the measured RSRPs or RSRQs.

A SIB is transmitted 410 from the target base station to the source base station indicating the potential TDD configuration of the target base station. Then, the source base station transmits 420 the potential TDD configuration of the target base station to the wireless device. At 430, the decision to initiate a handover is made. In particular, the wireless device calculates the TDD configuration difference, calculates the TDD offset and decides to initiate a handover based on the combination of the power offset and the TDD offset. The wireless device then transmits 440 an A3 measurement report to initiate the handover. As noted above, the TDD offset is reflected in the A3 measurement report and thus the base station can finally make a handover decision based on the A3 measurement report.

Figure 5:
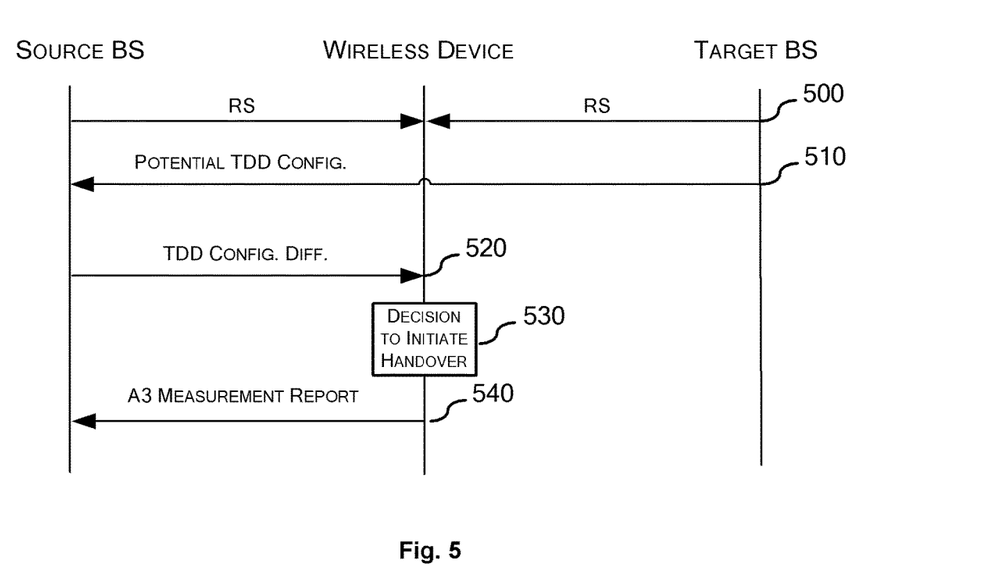

FIG. 5 shows an alternative to the sequence shown in FIG. 4. The sequence in FIG. 5 is basically the same as that in FIG. 4, except that the wireless device receives the TDD configuration difference from the source base station instead of calculating it by itself. In particular, the wireless device receives 520 the TDD configuration difference from the source base station. At 530, the wireless device calculates the TDD offset and decides to initiate a handover based on the combination of the power offset and the TDD offset. The steps 500, 510 and 540 in FIG. 5 are substantially the same as the steps 400, 410 and 440 in FIG. 4 and thus the description thereof will be omitted here.

Figure 6:
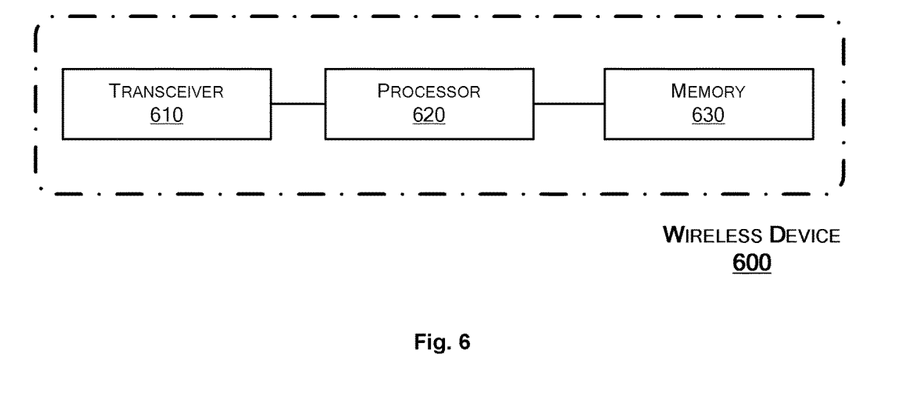
FIG. 6 is a block diagram of a wireless device according to an embodiment of the present disclosure.

FIG. 6 is a block diagram of a wireless device 600 according to an embodiment of the present disclosure.

The wireless device 600 includes: a transceiver 610 adapted to communicate with a source base station and a target base station; a processor 620; and a memory 630 storing instructions. The instructions, when executed by the processor 620, cause the wireless device 600 to perform the method 100 as described above in connection with FIG. 1. It is to be noted that the term "processor" used herein includes any hardware capable of executing instructions and/or program codes, e.g., a microprocessor such as a Central Processing Unit (CPU), a digital signal processor (DSP) and any other general-purpose or application specific processors. It is to be noted that the term "memory" used herein includes any storage medium capable of storing instructions and/or program codes, e.g., a magnetic storage medium, an optical storage medium, a semiconductor storage medium and any other volatile or non-volatile storage mediums.

Alternatively, the wireless device can include several functional units which can be implemented in hardware, software, firmware or any combination thereof. In an embodiment, the wireless device includes: a power offset calculation unit for calculating a power offset indicative of a difference between a receiving power from the target base station and a receiving power from the source base station; an obtaining unit for obtaining a Time Division Duplex (TDD) configuration difference between a TDD configuration of the target base station and a TDD configuration of the source base station; a TDD offset calculating unit for calculating a TDD offset based on the TDD configuration difference and an uplink-downlink traffic model of the wireless device; and an initiation unit for initiating the handover when a combination of the power offset and the TDD offset exceeds a threshold.

In an embodiment, if the uplink-downlink traffic model of the wireless device indicates that more uplink than downlink traffic is desired by the wireless device: the TDD offset calculating unit calculates the TDD offset as a positive value if the TDD configuration difference indicates that the target base station is able to provide more uplink resources than the source base station; and the TDD offset calculating unit calculates the TDD offset as a negative value if the TDD configuration difference indicates that the target base station is able to provide less uplink resources than the source base station.

In an embodiment, if the uplink-downlink traffic model of the wireless device indicates that more downlink than uplink traffic is desired by the wireless device: the TDD offset calculating unit calculates the TDD offset as a positive value if the TDD configuration difference indicates that the target base station is able to provide more downlink resources than the source base station; and the TDD offset calculating unit calculates the TDD offset as a negative value if the TDD configuration difference indicates that the target base station is able to provide less downlink resources than the source base station.

In an embodiment, the TDD configuration difference includes: an uplink configuration difference indicative of a difference between the number of uplink subframes in a radio frame in the TDD configuration of the target base station and the number of uplink subframes in a radio frame in the TDD configuration of the source base station; and a downlink configuration difference indicative of a difference between the number of downlink subframes in a radio frame in the TDD configuration of the target base station and the number of downlink subframes in a radio frame in the TDD configuration of the source base station.

In an embodiment, the uplink-downlink traffic model of the wireless device comprises a ratio of uplink traffic desired by the wireless device to downlink traffic desired by the wireless device. The TDD offset calculating unit calculates the TDD offset by weighting the uplink configuration difference and the downlink configuration difference by the ratio.

In an embodiment, the TDD configuration of the target base station is a current TDD configuration of the target base station or a potential TDD configuration of the target base station to which the target base station possibly switches in a future time period.

In an embodiment, the obtaining unit receives the TDD configuration difference from the source base station.

In an embodiment, the obtaining unit obtains the TDD configuration of the target base station and the TDD configuration of the source base station and calculates the TDD configuration difference between the TDD configuration of the target base station and the TDD configuration of the source base station.

Figure 7:
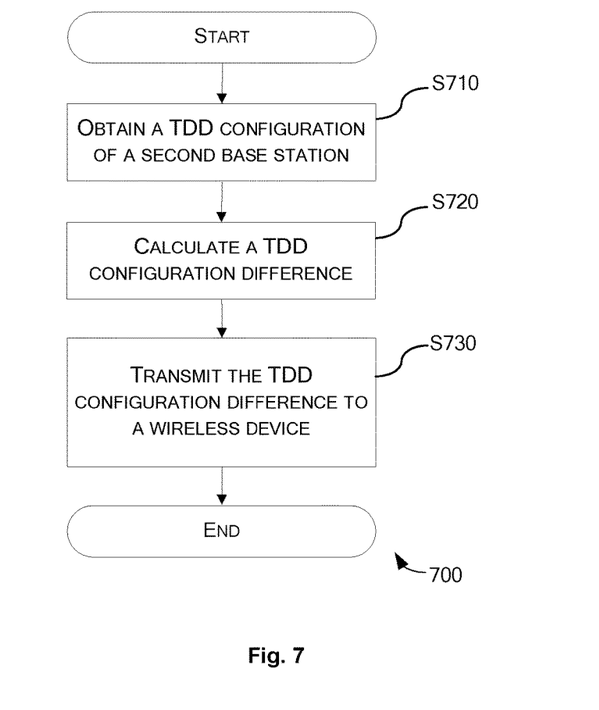
FIG. 7 is a flowchart illustrating a method in a base station according to an embodiment of the present disclosure.

FIG. 7 is a flowchart illustrating a method 700 in a first base station according to an embodiment of the present disclosure.

At step S710, the first base station obtains a Time Division Duplex (TDD) configuration of a second base station.

Here, the first base station may receive a report from the wireless device indicating the TDD configuration of the second base station.

Alternatively, the first base station may receive the TDD configuration of the second base station from the second base station via an X2 interface. The TDD configuration of the second base station may be a current TDD configuration of the second base station or a potential TDD configuration of the second base station to which the second base station possibly switches in a future time period.

According to still another alternative, the first base station may receive a system information broadcast (SIB) from the second base station indicating the TDD configuration of the second base station.

At step S720, the first base station calculates a TDD configuration difference between the TDD configuration of the second base station and a TDD configuration of the first base station.

At step S730, the first base station transmits the TDD configuration difference to a wireless device to enable the wireless device to initiate a handover from the first base station to the second base station at least partly based on the TDD configuration difference.

Figure 8:
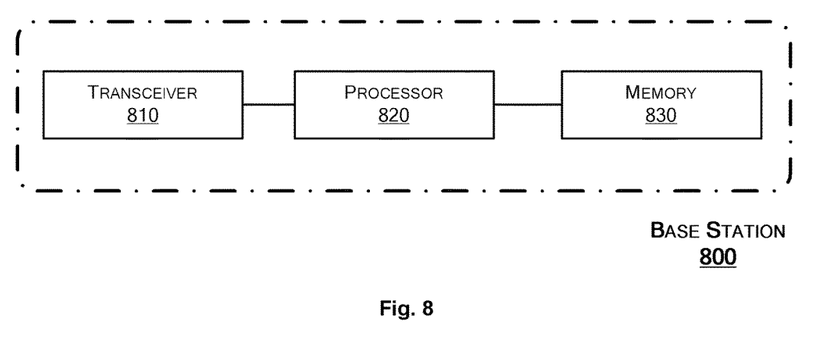
FIG. 8 is a block diagram of a base station according to an embodiment of the present disclosure.

FIG. 8 is a block diagram of a base station 800 according to an embodiment of the present disclosure.

The base station includes: a transceiver 810 adapted to communicate with a source base station and a target base station; a processor 820; and a memory 830 storing instructions. The instructions, when executed by the processor 820, cause the base station 800 to perform the method 700 as described above in connection with FIG. 7. It is to be noted that the term "processor" used herein includes any hardware capable of executing instructions and/or program codes, e.g., a microprocessor such as a Central Processing Unit (CPU), a digital signal processor (DSP) and any other general-purpose or application specific processors. It is to be noted that the term "memory" used herein includes any storage medium capable of storing instructions and/or program codes, e.g., a magnetic storage medium, an optical storage medium, a semiconductor storage medium and any other volatile or non-volatile storage mediums.

Alternatively, the base station can include several functional units which can be implemented in hardware, software, firmware or any combination thereof. In an embodiment, the base station includes: an obtaining unit for obtaining a Time Division Duplex (TDD) configuration of another base station; a calculation unit for calculating a TDD configuration difference between the TDD configuration of the other base station and a TDD configuration of the base station; and a transmission unit for transmitting the TDD configuration difference to a wireless device to enable the wireless device to initiate a handover from the base station to the other base station at least partly based on the TDD configuration difference.

In an embodiment, the obtaining unit can receive a report from the wireless device indicating the TDD configuration of the other base station.

In an embodiment, the obtaining unit can receive the TDD configuration of the other base station from the other base station via an X2 interface. The TDD configuration of the target base station can be a current TDD configuration of the target base station or a potential TDD configuration of the target base station to which the target base station possibly switches in a future time period.

In an embodiment, the obtaining unit can receive a SIB from the other base station indicating the TDD configuration of the other base station.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method performed in a wireless device that initiates a handover from a source base station to a target base station, the method comprising:
    calculating a power offset indicative of a difference between a receiving power from the target base station and a receiving power from the source base station;
    obtaining a Time Division Duplex, TDD, configuration difference between a TDD configuration of the target base station and a TDD configuration of the source base station;
    calculating a TDD offset based on the TDD configuration difference and an uplink-downlink traffic model of the wireless device; and
    initiating the handover based on a combination of the power offset and the TDD offset exceeding a threshold,
    wherein the uplink-downlink traffic model comprises a ratio of uplink traffic desired by the wireless device to downlink traffic desired by the wireless device that indicates the wireless device desires one of more uplink or more downlink resources.

2. The method of claim 1, wherein based on the uplink-downlink traffic model of the wireless device indicating that more uplink than downlink traffic is desired by the wireless device:
    the TDD offset is calculated as a positive value based on the TDD configuration difference indicating that the target base station is able to provide more uplink resources than the source base station; and
    the TDD offset is calculated as a negative value based on the TDD configuration difference indicating that the target base station is able to provide less uplink resources than the source base station.

3. The method of claim 1, wherein based on the uplink-downlink traffic model of the wireless device indicating that more downlink than uplink traffic is desired by the wireless device:
    the TDD offset is calculated as a positive value based on the TDD configuration difference indicating that the target base station is able to provide more downlink resources than the source base station; and
    the TDD offset is calculated as a negative value based on the TDD configuration difference indicating that the target base station is able to provide less downlink resources than the source base station.

4. The method of claim 1, wherein the TDD configuration difference comprises:
    an uplink configuration difference indicative of a difference between the number of uplink subframes in a radio frame in the TDD configuration of the target base station and the number of uplink subframes in a radio frame in the TDD configuration of the source base station; and
    a downlink configuration difference indicative of a difference between the number of downlink subframes in a radio frame in the TDD configuration of the target base station and the number of downlink subframes in a radio frame in the TDD configuration of the source base station.

5. The method of claim 1, wherein the TDD offset is calculated by weighting the uplink configuration difference and the downlink configuration difference by the ratio.

6. The method of claim 1, wherein the TDD configuration of the target base station is a current TDD configuration of the target base station.

7. The method of claim 1, wherein obtaining a TDD configuration difference comprises:
    receiving the TDD configuration difference from the source base station.

8. The method of claim 1, wherein obtaining a TDD configuration difference comprises:
    receiving the TDD configuration of the target base station and the TDD configuration of the source base station; and
    calculating the TDD configuration difference between the TDD configuration of the target base station and the TDD configuration of the source base station.

9. The method of claim 1, wherein the TDD configuration of the target base station is a potential TDD configuration of the target base station to which the target base station possibly switches in a future time period.

10. The method of claim 1, wherein calculating the TDD offset based on the TDD configuration difference and the uplink-downlink traffic model of the wireless device comprises calculating the TDD offset as one of a positive value or a negative value based on the uplink-downlink traffic model and the TDD configuration difference.

11. A wireless device, comprising:
    a transceiver adapted to communicate with a source base station and a target base station;
    a processor; and
    a memory storing instructions which, when executed by the processor, cause the wireless device to:
        calculate a power offset indicative of a difference between a receiving power from the target base station and a receiving power from the source base station;
        obtain a Time Division Duplex, TDD, configuration difference between a TDD configuration of the target base station and a TDD configuration of the source base station;
        calculate a TDD offset based on the TDD configuration difference and an uplink-downlink traffic model of the wireless device; and
        initiate a handover from the source base station to the target base station based on a combination of the power offset and the TDD offset exceeding a threshold,
    wherein the uplink-downlink traffic model comprises a ratio of uplink traffic desired by the wireless device to downlink traffic desired by the wireless device that indicates the wireless device desires one of more uplink or more downlink resources.

12. A method performed in a first base station, the method comprising:
  obtaining a Time Division Duplex, TDD, configuration of a second base station;
  calculating a TDD configuration difference value based on a difference between the TDD configuration of the second base station and a TDD configuration of the first base station; and
  transmitting the TDD configuration difference value to a wireless device to enable the wireless device to initiate a handover from the first base station to the second base station at least partly based on the TDD configuration difference value.

13. The method of claim 12, wherein obtaining a TDD configuration of a second base station comprises:
  receiving a report from the wireless device indicating the TDD configuration of the second base station.

14. The method of claim 12, wherein obtaining a TDD configuration of a second base station comprises:
  receiving the TDD configuration of the second base station from the second base station via an X2 interface.

15. The method of claim 14, wherein the TDD configuration of the second base station is a current TDD configuration of the second base station.

16. The method of claim 14, wherein the TDD configuration of the second base station is a potential TDD configuration of the second base station to which the second base station possibly switches in a future time period.

17. The method of claim 12, wherein obtaining a TDD configuration of a second base station comprises:
  receiving a system information broadcast, SIB, from the second base station indicating the TDD configuration of the second base station.

18. A base station, comprising:
  a transceiver adapted to communicate with another base station and a wireless device;
  a processor; and
  a memory storing instructions which, when executed by the processor, cause the base station to:
    obtain a Time Division Duplex, TDD, configuration of another base station;
    calculate a TDD configuration difference value based on a difference between the TDD configuration of the second base station and a TDD configuration of the first base station; and
    transmit the TDD configuration difference value to a wireless device to enable the wireless device to initiate a handover from the base station to the other base station at least partly based on the TDD configuration difference.

* * * * *